(12) United States Patent
Allgaier et al.

(10) Patent No.: US 8,666,584 B2
(45) Date of Patent: Mar. 4, 2014

(54) METHOD FOR OPERATION OF A DRIVE TRAIN

(71) Applicant: ZF Friedrichshafen AG, Friedrichshafen (DE)

(72) Inventors: Bernd Allgaier, Kressbronn (DE); Friedrich Tenbrock, Langenargen (DE); Michael Gromus, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/933,179

(22) Filed: Jul. 2, 2013

(65) Prior Publication Data

US 2013/0288852 A1 Oct. 31, 2013

Related U.S. Application Data

(62) Division of application No. 13/055,288, filed as application No. PCT/EP2009/059165 on Jul. 16, 2009, now Pat. No. 8,521,355.

(30) Foreign Application Priority Data

Jul. 24, 2008 (DE) .......................... 10 2008 040 660

(51) Int. Cl.
*B60L 9/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 5,614,809 A | 3/1997 | Kiuchi et al. | |
| 6,846,269 B2 | 1/2005 | Reuschel et al. | |
| 8,224,548 B2 | 7/2012 | Ludwig et al. | |
| 8,374,759 B2 | 2/2013 | Arlauskas et al. | |
| 2001/0042647 A1 | 11/2001 | Sakamoto et al. | |
| 2002/0042327 A1 | 4/2002 | Rueschel et al. | |
| 2003/0022759 A1* | 1/2003 | Frotscher | 477/174 |
| 2004/0060753 A1 | 4/2004 | Ito et al. | |
| 2004/0084907 A1 | 5/2004 | Kuribayashi et al. | |
| 2004/0157704 A1 | 8/2004 | Stork et al. | |

(Continued)

FOREIGN PATENT DOCUMENTS

| | | |
|---|---|---|
| DE | 102 28 709 A1 | 2/2003 |
| DE | 10 2004 024 213 A1 | 12/2005 |

(Continued)

*Primary Examiner* — Hussein A. Elchanti

(74) *Attorney, Agent, or Firm* — Davis & Bujold, PLLC; Michael J. Bujold

(57) ABSTRACT

A method of operating a drive train of a motor vehicle in which the drive train comprises at least a hybrid drive with an internal combustion engine and an electric motor, a clutch connected between the combustion engine and the electric motor, a transmission arranged between the hybrid drive and a drive output, and preferably a transmission-internal or -external starting element. When the combustion engine is entrained into motion with the help of the electric motor, the clutch connected between the internal combustion engine and the electric motor is partially engaged to a slipping condition where the clutch transmits a constant torque, and during this entrainment, and comparing an actual gradient of the combustion engine's speed produced with a nominal gradient of the combustion engine's speed. When the actual gradient is greater than the nominal gradient, the method concludes that the combustion engine is started and actively providing torque.

6 Claims, 2 Drawing Sheets

(56) References Cited

U.S. PATENT DOCUMENTS

| | | |
|---|---|---|
| 2007/0246273 A1 * | 10/2007 | Tenbrock et al. ............ 180/65.2 |
| 2008/0262691 A1 | 10/2008 | Ludwig et al. |
| 2008/0318731 A1 | 12/2008 | Denis |
| 2009/0164085 A1 | 6/2009 | Barton et al. |
| 2010/0056328 A1 | 3/2010 | Schenk et al. |
| 2010/0107610 A1 | 5/2010 | Schussler et al. |
| 2010/0185370 A1 | 7/2010 | Wurthner et al. |
| 2010/0241335 A1 | 9/2010 | Aso |
| 2010/0305790 A1 | 12/2010 | Yu et al. |
| 2010/0324762 A1 * | 12/2010 | Imaseki et al. .................. 701/22 |
| 2012/0065819 A1 * | 3/2012 | Christman et al. .............. 701/22 |

FOREIGN PATENT DOCUMENTS

| | | |
|---|---|---|
| DE | 10 2006 048 358 A1 | 4/2008 |
| EP | 0 698 522 A1 | 2/1996 |
| EP | 1 122 110 A2 | 8/2001 |
| EP | 1 418 325 A2 | 5/2004 |
| WO | 2006/106254 A2 | 10/2006 |

* cited by examiner

METHOD FOR OPERATION OF A DRIVE TRAIN

This application is a divisional of U.S. patent application Ser. No. 13/055,288 filed Jan. 21, 2011, which is a National Stage completion of PCT/EP2009/059165 filed Jul. 16, 2009, which claims priority from German patent application serial no. 10 2008 040 660.0 filed Jul. 24, 2008.

FIELD OF THE INVENTION

The invention concerns a method for operating a drive train of a motor vehicle that comprises at least a transmission and a hybrid drive.

BACKGROUND OF THE INVENTION

The main components of a drive train of a motor vehicle are a drive assembly and a transmission. The transmission converts torques and speeds, and thus transforms the traction force produced by the drive assembly. The present invention concerns a method for operating a drive train that comprises at least a transmission and, as the drive assembly, a hybrid drive with an internal combustion engine and an electric motor.

In a drive train with so-termed parallel hybrid drive, a clutch is connected between the internal combustion engine and the electric motor of the hybrid drive, by means of which the internal combustion engine of the hybrid drive can be disengaged from a drive output of the drive train. When such a drive train with a parallel hybrid drive is started, the internal combustion engine is typically switched off and the clutch connected between the internal combustion engine and the electric motor is disengaged.

Then, when the switched-off internal combustion engine is to be started, this can be done by at least partially engaging the clutch connected between the internal combustion engine and the electric motor so that the internal combustion engine is entrained into motion by the electric motor, and to carry out this entrainment optimally the point in time must be known, from which the internal combustion engine has been started and is actively producing a torque. Until now that time point has been determined in a motor control unit from the number of ignition sparks of the internal combustion engine. However, that is relatively inaccurate.

SUMMARY OF THE INVENTION

Starting from there the present invention addresses the problem of providing a new type of method for operating a drive train comprising a transmission and a hybrid drive, with which the time point from which, when the internal combustion engine is entrained into motion it actually starts up and actively produces torque, can be precisely determined.

According to a first aspect of the invention this problem is solved by a method in which, when the internal combustion engine is entrained into motion with the help of the electric motor the clutch connected between the internal combustion engine and the electric motor is engaged to a slipping condition where it transmits a constant clutch torque, then an actual gradient of the speed of the internal combustion engine produced during its entrainment is compared with a nominal gradient of the speed, and when the actual gradient is greater than the nominal gradient it is concluded that the internal combustion engine has started up and is actively producing a torque.

According to a second aspect of the invention the problem is solved by a method in which, during the entrainment into motion of the internal combustion engine an actual torque produced in the drive train is compared with a nominal torque, and when the actual torque is greater than the nominal torque it is concluded that the internal combustion engine has started up and is actively producing torque.

With both of these methods according to the invention for operating a drive train comprising a transmission and a hybrid drive, the time point from which, when the internal combustion engine is entrained into motion, it starts up and actively produces a torque, can be precisely determined.

BRIEF DESCRIPTION OF THE DRAWINGS

Preferred further developments of the invention emerge from the subordinate claims and the description given below. Example embodiments of the invention, to which it is not limited, are explained in more detail with reference to the drawings, which show:

DETAILED DESCRIPTION OF THE PREFERRED EMBODIMENTS

The present invention concerns a method for operating a drive train of a motor vehicle, which comprises at least a transmission and a hybrid drive.

Figure 1:
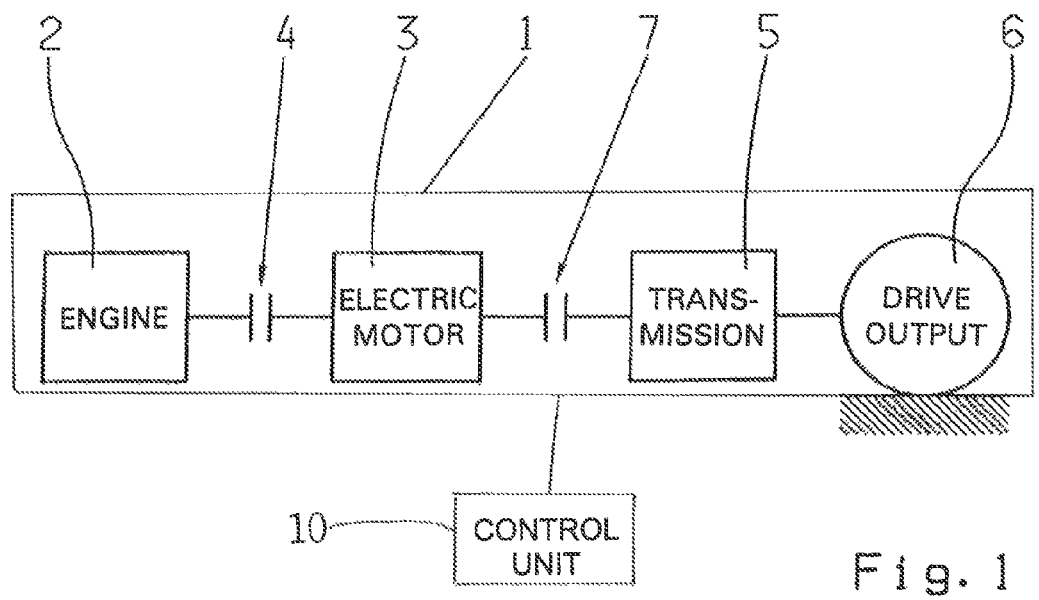
FIG. 1: A drive train layout of a motor vehicle, with which the method according to the invention can be used.

FIG. 1 shows as an example a drive train layout of a motor vehicle, with which the method according to the invention can be used. Thus, FIG. 1 shows a layout of a drive train 1 of a motor vehicle, the drive train 1 of FIG. 1 comprising a hybrid drive that consists of an internal combustion engine 2 and an electric motor. Between the internal combustion engine 2 and the electric motor 3 is connected a clutch 4, which is disengaged when the drive train 1 is powered exclusively by the electric motor 3. Besides the hybrid drive the drive train 1 of FIG. 1 also comprises a transmission 5 which transmits the traction force produced by the hybrid drive to a drive output 6, namely to driven wheels of the drive train. The transmission can be for example in the form of an automatic or an automated transmission. In an automatic transmission gearshifts are carried out without interruption of the traction force, and in an automated transmission gearshifts take place with interruption of the traction force.

In the drive train of FIG. 1 a further clutch 7 is connected between the electric motor 3 of the hybrid drive and the transmission 5. This clutch 7 serves as a transmission-external starting element when starting under electric motor power.

Figure 2:
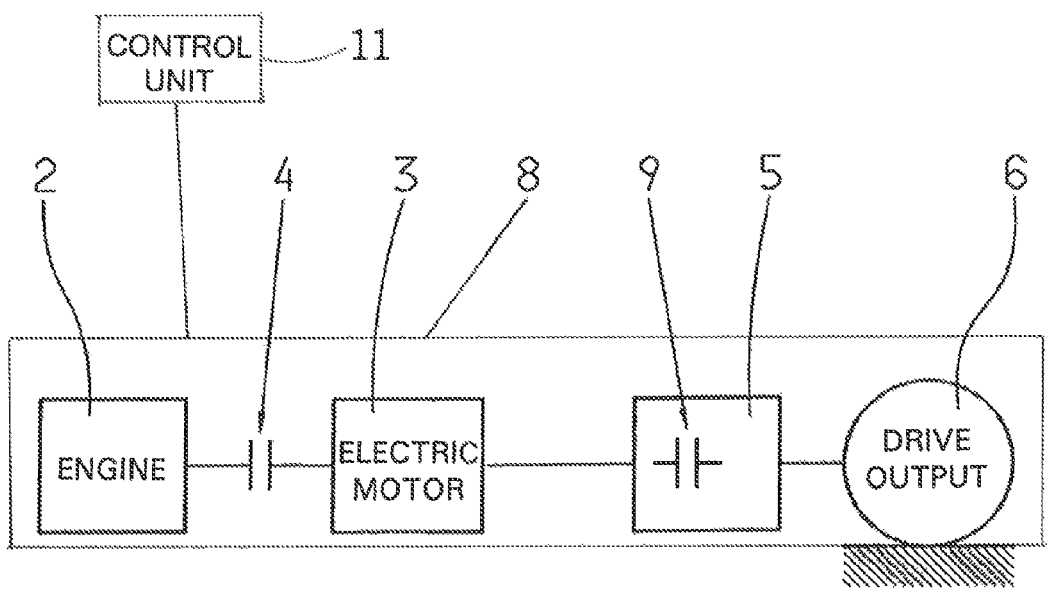
FIG. 2: An alternative drive train layout of a motor vehicle, with which the method according to the invention can be used.

FIG. 2 shows as an example another drive train layout of a motor vehicle with which the method according to the invention can be used, the drive train 8 of the drive train layout in FIG. 2 differing from the drive train 1 of the drive train layout in FIG. 1 in that the clutch 7 is omitted and replaced by a transmission-internal starting element 9.

The present invention concerns a method for operating a drive train of such type with a transmission and a hybrid drive, namely such details as concern the entrainment into motion of a switched-off internal combustion engine 2 with the help of the electric motor 3 of the hybrid drive, in order to precisely determine, during the entrainment of the internal combustion engine 2, the time point from which the internal combustion engine has started up and is actively providing a torque.

According to a first aspect of this invention, when the internal combustion engine 2 is entrained into motion with the help of the electric motor 3 the clutch 4 connected between the internal combustion engine 2 and the electric motor 3 is engaged to a slipping condition where it transmits a constant clutch torque $M_K$. In this case during the entrainment and after the so-termed break-away of the internal combustion engine 2, the speed $n_{VM}$ of the internal combustion engine increases linearly. According to this first aspect of the present invention, during the entrainment an actual gradient of the internal combustion engine's speed $n_{VM}$ produced while the internal combustion engine 2 is being entrained is determined and compared with a nominal gradient of the internal combustion engine's speed $n_{VM}$.

When the actual gradient of the internal combustion engine's speed is greater than the nominal gradient, it is concluded that the internal combustion engine has been started up and is actively providing a torque. In this case the preferred procedure is that when the actual gradient of the internal combustion engine's speed determined is greater than the nominal gradient plus a safety threshold, it is concluded that the internal combustion engine has started up and is actively providing a torque.

Figure 3:
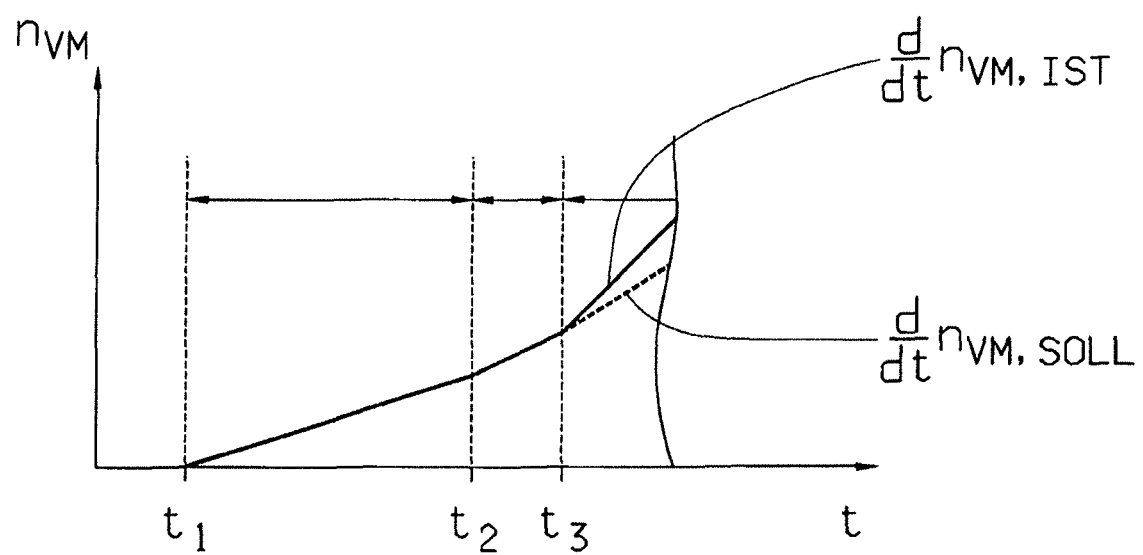
FIG. 3: A diagram to make clear the method according to the invention

FIG. 3 makes clear the method according to the invention in accordance with the first aspect of the invention, with reference to a diagram in which the internal combustion engine breaks away at a time $t_1$ and physically ignites at a time $t_2$, but without yet actively providing torque at the drive output 6.

From a time $t_3$ the internal combustion engine 2 actively provides torque at the drive output 6, so that from the time point $t_3$ the internal combustion engine's speed gradient d/dt $n_{VM,IST}$ actually produced deviates from the nominal internal combustion engine's speed gradient d/dt $n_{VM,SOLL}$. The nominal gradient for the internal combustion engine's speed is specified in a control unit 10, 11 of the drive train 1, 8 as an application parameter.

When it is concluded that the internal combustion engine has started, the internal combustion engine torque $M_{VM}$ provided by the internal combustion engine 2 is calculated as follows:

$$M_{VM} = \frac{dn_{VM}(t)}{dt} * J_{VM} - M_K$$

in which $n_{VM}$, is the speed of the internal combustion engine, $J_{VM}$ is the moment of inertia of the internal combustion engine and $M_K$ is the clutch torque transmitted by the clutch 4 connected between the internal combustion engine 2 and the electric motor 3.

According to the first aspect of the present invention, therefore, an actual gradient of the internal combustion engine's speed produced during the entrainment of the internal combustion engine 2 is compared with a speed gradient threshold, and when the actual gradient is greater than the speed gradient threshold, it is concluded that the internal combustion engine 2 has been started up. In this way the time from which the internal combustion engine 2 has started up and is actively providing a torque can be precisely determined.

According to a second aspect of the present invention, to determine the time from which the internal combustion engine 2 has started up and is actively providing torque, during the entrainment of the internal combustion engine, a torque balance is drawn up for the drive train, in which an actual torque produced in the drive train is compared with a specific nominal torque and when the actual torque is greater than the nominal torque, it is concluded that the internal combustion engine 2 has started up and is providing a torque.

In this case the preferred procedure is that when the actual torque is greater than the specified nominal torque plus a safety threshold, it is concluded that the internal combustion engine has started up and is actively providing a torque.

Then, when it is concluded that the internal combustion engine 2 has started up and the clutch 4 connected between the internal combustion engine 2 and the electric motor 3 is engaged as far as a slipping condition, the internal combustion engine torque $M_{VM}$ delivered by the internal combustion engine 2 is calculated from the following equation:

$$M_{VM} = \frac{dn_{VM}(t)}{dt} * J_{VM} - M_K$$

in which $n_{VM}$, is the speed of the internal combustion engine, $J_{VM}$ is the moment of inertia of the internal combustion engine and $M_K$ is the clutch torque transmitted by the clutch 4 connected between the internal combustion engine 2 and the electric motor 3.

In contrast, when it is concluded that the internal combustion engine 2 has started up and the clutch 4 between the internal combustion engine 2 and the electric motor 3 has been completely engaged, the internal combustion engine torque $M_{VM}$ delivered by the internal combustion engine 2 is calculated using the following equation:

$$M_{VW} = \frac{dn_{EM}(t)}{dt} * J_{GES} - M_{EM}$$

in which $n_{EM}$ is the speed of the electric motor, $J_{GES}$ is the moment of inertia of the drive train as a whole, and $M_{EM}$ is the electric motor torque provided by the electric motor 3.

In the context of the second aspect of the invention, when, during the entrainment of the internal combustion engine 2 with the help of the electric motor 3 with the clutch 4 fully engaged the speed of the electric motor 3 is regulated with an integral adjustment fraction, from the integral adjustment fraction it can be deduced whether the internal combustion engine has started up and is actively providing torque for the drive output of the drive train. Then, if during this the integral adjustment fraction decreases, particularly to below a specified limit value, it is concluded that the internal combustion engine has started up and is actively providing torque for the drive output of the drive train.

By virtue of the second aspect of the present invention too, the time from which when the internal combustion engine 2 is entrained into motion it begins actively providing a torque at the drive output can be precisely determined.

| | Indexes |
|---|---|
| 1 | Drive train |
| 2 | Internal combustion engine |
| 3 | Electric motor |
| 4 | Clutch |
| 5 | Transmission |
| 6 | Drive output |

-continued

| Indexes | |
|---|---|
| 7 | Clutch/transmission-external starting element |
| 8 | Drive train |
| 9 | Transmission-internal starting element |

The invention claimed is:

1. A method of operating a drive train of a motor vehicle in which the drive train comprises a drive train control unit, at least a hybrid drive with an internal combustion engine and an electric motor, a clutch connected between the internal combustion engine and the electric motor, a transmission arranged between the hybrid drive and a drive output, and either a transmission-internal or transmission-external starting element, the method comprising the steps of:
 comparing, with the drive train control unit, an actual torque produced in the drive train with a nominal torque during entrainment of the internal combustion engine into motion; and
 concluding, with the drive train control unit, that the internal combustion engine has started up and is actively providing torque when the actual torque is greater than the nominal torque.

2. The method according to claim 1, further comprising the step of concluding that the internal combustion engine has started up and is actively providing torque when the actual torque is greater than the nominal torque plus a safety threshold.

3. The method according to claim 1, further comprising the step of concluding that the internal combustion engine has started up and is actively providing torque when the clutch connected between the internal combustion engine and the electric motor is fully engaged and a speed of the electric motor is regulated with an integral adjustment fraction, and, when during regulation of the speed of the electric motor, the integral adjustment fraction decreases.

4. The method according to claim 3, further comprising the step of concluding that the internal combustion engine has started up and is actively providing torque when, during regulation of the speed of the electric motor, the integral adjustment fraction falls below a specified limit value.

5. The method according to claim 1, further comprising the step of, when the method concludes that the internal combustion engine has started up and the clutch connected between the internal combustion engine and the electric motor is engaged to a slipping condition, calculating, with the drive train control unit, the internal combustion engine torque ($M_{VM}$) delivered by the internal combustion engine using an equation:

$$M_{VM} = \frac{dn_{VM}(t)}{dt} * J_{VM} - M_K$$

wherein $n_{VM}$ is a speed of the internal combustion engine,
$J_{VM}$ is a moment of inertia of the internal combustion engine, and
$M_K$ is a clutch torque transmitted by the clutch connected between the internal combustion engine and the electric motor.

6. The method according to claim 1, further comprising the step of, when the method concludes that the internal combustion engine has started up and the clutch connected between the internal combustion engine and the electric motor is fully engaged, calculating, with the drive train control unit, the internal combustion engine torque ($M_{VM}$) delivered by the internal combustion engine using an equation:

$$M_{VW} = \frac{dn_{EM}(t)}{dt} * J_{GES} - M_{EM}$$

wherein $n_{EM}$ is a speed of the electric motor,
$J_{GES}$ is a moment of inertia of the drive train as a whole, and
$M_{EM}$ is an electric motor torque delivered by the electric motor.

* * * * *